(12) United States Patent
Smith et al.

(10) Patent No.: US 9,470,953 B2
(45) Date of Patent: Oct. 18, 2016

(54) HIGH POWER OPTICAL SWITCH

(71) Applicant: Raytheon Company, Waltham, MA (US)

(72) Inventors: Irl W. Smith, Concord, MA (US); Terry A. Dorschner, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/404,821

(22) PCT Filed: May 24, 2013

(86) PCT No.: PCT/US2013/042641
§ 371 (c)(1),
(2) Date: Dec. 1, 2014

(87) PCT Pub. No.: WO2013/177511
PCT Pub. Date: Nov. 28, 2013

(65) Prior Publication Data
US 2015/0185584 A1    Jul. 2, 2015

Related U.S. Application Data

(60) Provisional application No. 61/651,292, filed on May 24, 2012.

(51) Int. Cl.
*G02B 6/42* (2006.01)
*G02F 1/313* (2006.01)
(Continued)

(52) U.S. Cl.
CPC ........... *G02F 1/3137* (2013.01); *G02B 5/3083* (2013.01); *G02B 6/3542* (2013.01); *G02B 6/3546* (2013.01); *G02B 6/3588* (2013.01); *G02B 27/283* (2013.01); *G02F 1/1393* (2013.01); *G02F 1/133385* (2013.01); *G02F 1/133528* (2013.01); *G02F 1/292* (2013.01);
(Continued)

(58) Field of Classification Search
CPC ...................................................... G02F 1/3137
See application file for complete search history.

(56) References Cited

U.S. PATENT DOCUMENTS

| 4,943,709 A | 7/1990 | Grinberg et al. |
| 4,989,941 A * | 2/1991 | Soref ......................... G02F 1/31 349/196 |

(Continued)

OTHER PUBLICATIONS

Response to Rule 161(1) and 162 EPC Communication filed on Jul. 22, 2015 for EP Application No. 13726661.5.
(Continued)

*Primary Examiner* — Rhonda Peace
(74) *Attorney, Agent, or Firm* — Daly, Crowley, Mofford & Durkee, LLP

(57) ABSTRACT

An optical switch (10) is capable of routing a high-power beam incident at one or more input ports (12) of the optical switch to either of two or more output ports (14,16), the optical switch comprising: at least one switching stage, each of the at least one switching stages comprising: a switchable high-power liquid crystal (LC) half-wave plate (HWP), oriented with its fast axis at 45° to an input polarization direction such that in response to an incident polarized laser beam provided to said switchable high-power liquid crystal, half-wave plate, said HWP acts as a polarization rotator; and a polarizing beam splitter (PBS) disposed in an optical path to intercept light signals output from said switchable high-power liquid crystal (LC) half wave plate (HWP).

26 Claims, 7 Drawing Sheets

(51) Int. Cl.

| | |
|---|---|
| G02F 1/1333 | (2006.01) |
| G02F 1/139 | (2006.01) |
| G02F 1/31 | (2006.01) |
| H04Q 11/00 | (2006.01) |
| G02B 5/30 | (2006.01) |
| G02B 27/28 | (2006.01) |
| H01S 3/091 | (2006.01) |
| G02F 1/29 | (2006.01) |
| G02B 6/26 | (2006.01) |
| G02F 1/1335 | (2006.01) |
| G02B 6/35 | (2006.01) |

(52) U.S. Cl.
CPC .............. G02F 1/31 (2013.01); H01S 3/091 (2013.01); H04Q 11/0005 (2013.01); G02B 6/3544 (2013.01); G02F 2001/13355 (2013.01); G02F 2001/133302 (2013.01); G02F 2201/38 (2013.01); G02F 2202/10 (2013.01); H04Q 2011/0026 (2013.01); H04Q 2011/0035 (2013.01)

(56) References Cited

U.S. PATENT DOCUMENTS

| | | |
|---|---|---|
| 5,216,729 A | 6/1993 | Berger et al. |
| 5,253,033 A | 10/1993 | Lipchak et al. |
| 5,276,747 A | 1/1994 | Pan |
| 5,363,228 A | 11/1994 | DeJule et al. |
| 5,404,365 A | 4/1995 | Hiiro |
| 5,740,288 A | 4/1998 | Pan |
| 5,963,682 A | 10/1999 | Dorschner et al. |
| 6,704,474 B1 | 3/2004 | Dorschner et al. |
| 6,710,736 B2 | 3/2004 | Fullerton et al. |
| 7,006,747 B2 | 2/2006 | Escuti et al. |
| 7,196,758 B2 | 3/2007 | Crawford et al. |
| 7,215,472 B2 | 5/2007 | Smith et al. |
| 7,428,100 B2 | 9/2008 | Smith et al. |
| 7,570,310 B2 | 8/2009 | Harada et al. |
| 7,692,759 B2 | 4/2010 | Escuti et al. |
| 7,848,370 B2 | 12/2010 | Kewitsch et al. |
| 7,889,767 B2 | 2/2011 | Betin et al. |
| 7,990,600 B2 | 8/2011 | Sachs et al. |
| 8,268,707 B2 | 9/2012 | Resler et al. |
| 2005/0018954 A1 | 1/2005 | Vinouze et al. |
| 2006/0033995 A1 | 2/2006 | Smith et al. |
| 2006/0210219 A1 | 9/2006 | Takahashi et al. |
| 2007/0014517 A1 | 1/2007 | Rizoiu et al. |
| 2007/0104417 A1* | 5/2007 | Tanaka ............... G02F 1/293 385/16 |
| 2009/0029071 A1 | 1/2009 | Nakayama et al. |
| 2009/0142073 A1 | 6/2009 | Smith et al. |
| 2010/0320474 A1 | 12/2010 | Resler et al. |
| 2012/0081621 A1 | 4/2012 | Dorschner et al. |
| 2014/0268328 A1 | 9/2014 | Dorschner et al. |
| 2015/0185584 A1* | 7/2015 | Smith ............... G02F 1/133385 385/16 |

OTHER PUBLICATIONS

Response to Australian Office Action as filed on Sep. 28, 2015 for Appl. No. 2013266151; 29 pages.
Response to the Office Action for Appl. No. 702303 filed in New Zealand Intellectual Property Office on Sep. 22, 2015; 61 pages.
Further Examination Report filed in New Zealand Intellectual Property Office for Appl. No. 702303 dated Oct. 20, 2015; 3 pages.
Wang, et al.; "Stressed liquid-crystal optical phased array for fast tip-tilt wavefront correction;" Applied Optics; vol. 44; No. 36; Dec. 20, 2005; pp. 7754-7759.
Examiner's Report dated Nov. 27, 2015 for Appl. No. 2,874,615; 4 pages.
Response to Examination Report dated Oct. 20, 2015 as filed on Dec. 22, 2015 for New Zealand Appl. No. 702303; 53 pages.

Further Examination Report Postponed Acceptance dated Feb. 1, 2016 for New Zealand Appl. No. 702303; 1 page.
Voluntary Amendment as filed Mar. 3, 2016 for Australian Application No. 2015246091; 54 pages.
Australian Office Action dated May 28, 2015 for Appl. No. 2013266151.
New Zealand Office Action dated Mar. 24, 2015 for Appl. No. 702303; 3 pages.
Crawford, et al.; "Internal surface, orientational order, and distribution of a polymer network in a liquid crystal matrix;" Physical Review E; Rapid Communications; The American Physical Society; vol. 52; No. 2; Aug. 1995; pp. R1273-R1276.
Dorschner; "Adaptive Photonic Phase Locked Elements;" An Overview; DARPA/MTO Symposium; Mar. 2007; pp. 1-15.
Kim, et al.; "Wide-angle, nonmechanical beam steering using thin liquid crystal polarization gratings;" Proc. of SPIE; vol. 7093; Jan. 2008, pp. 1-12.
McManamon, et al.; "A Review of Phased Array Steering for Narrow-Band Electrooptical System;" Proceeding of the IEEE; vol. 97; No. 6; Jun. 2009; pp. 1078-1096.
McManamon, et al., "Optical Phased Array Technology;" Proceedings of the IEEE; vol. 84; No. 2; Feb. 1996; pp. 268-298.
Miller; Self-aligning universal beam coupler; Optics Express; vol. 21; No. 5; Mar. 11, 2013; pp. 6360-6370.
Nicolescu, et al.; "Polarization-independent tunable optical filters based on liquid crystal polarization gratings;" Proceedings of SPIE; vol. 6654; No. 665405; Aug. 2007; 12 pages.
Rockwell, et al.; "Semi-guiding high-aspect-ratio-core (SHARC) fiber providing single-mode operation and an ultra-large core area in a compact coliable package;" Optics Express; vol. 19; No. 15; Jul. 18, 2011; pp. 14746-14762.
International Preliminary Report on Patentability of the ISA for PCT/US2011/054245 dated Apr. 11, 2013.
Office Action dated Feb. 21, 2013 from U.S. Appl. No. 13/250,111.
Partial PCT Search Report received with Invitation to Pay Additional Fees in PCT/US2011/054245 dated Jan. 18, 2012.
PCT Search Report of the ISA for PCT/US2011/054245 dated Mar. 26, 2012.
Written Opinion of the ISA for PCT/US2011/054245 dated Mar. 26, 2012.
Response to Office Action dated Feb. 21, 2013 as filed on May 16, 2013 from U.S. Appl. No. 13/250,111.
Office Action dated Sep. 6, 2013 from U.S. Appl. No. 13/250,111.
Rule 161 Communication for Application No. 11770009.6 dated Jun. 12, 2013.
Response to Rule 161 Communication for Application No. 11770009.6 as filed on Dec. 23, 2013.
"Liquid crystal blazed-grating beam deflector," by Wang et al, Applied Optics, vol. 39, No. 35, pp. 6545-6555, 2000.
PCT Search Report of the ISA for PCT/US2013/042653 dated Nov. 7, 2013 6 pages.
Written Opinion of the ISA for PCT/US2013/042653 dated Nov. 7, 2013 9 pages.
PCT International Preliminary Report on Patentability for PCT/US2013/042653 dated May 24, 2013 10 pages.
Fan et al.; "Fast-Response and scattering-free polymer network liquid crystals for infrared light modulators;" Applied Physics Letters; American Institute of Physics; vol. 84; No. 8; Feb. 23, 2004; pp. 1233-1235.
Ren et al.; "Tunable Microlens arrays using polymer network liquid crystal;" Optics Communications; Science Direct; Sep. 22, 2003; pp. 267-271.
PCT International Preliminary Report on Patentability for PCT/US2013/042646 dated May 24, 2013 6 pages.
PCT Search Report of the ISA for PCT/US2013/042646 dated Sep. 3, 2013 5 pages.
Written Opinion of the ISA for PCT/US2013/042646 dated Sep. 3, 2013 4 pages.
PCT Invitation to Pay Additional Fees for PCT/US2013/042641 dated Sep. 20, 2013 10 pages.
Gelissen et al.; "Polarization Control Using Nematic Liquid Crystals;" Advances in Optical Information Processing; Proceedings of SPIE vol. 4046; Apr. 25, 2000; pp. 118-129.

(56) References Cited

OTHER PUBLICATIONS

PCT Search Report of the ISA for PCT/US2013/042641 dated Jan. 30, 2014 9 pages.
Written Opinion of the ISA for PCT/US2013/042641 dated Jan. 30, 2014 9 pages.
PCT International Preliminary Report on Patentability for PCT/US2013/042641 dated Dec. 4, 2014 11 pages.
U.S. Appl. No. 13/250,111, filed Sep. 30, 2011.
U.S. Appl. No. 13/801,411, filed Mar. 13, 2013.
Response to Examner's Report dated Nov. 27, 2015 for Canadian Application No. 2874615 as fled on Apr. 1, 2016; 23 pages.

* cited by examiner

HIGH POWER OPTICAL SWITCH

CROSS REFERENCE TO RELATED APPLICATIONS

This application is a U.S. National Stage of PCT application PCT/US2013/042641 filed in the English language on May 24, 2013, and entitled "HIGH POWER OPTICAL SWITCH," which claims the benefit of provisional application No. 61/651,292 filed May 24, 2012, which application is hereby incorporated herein by reference.

STATEMENT REGARDING FEDERALLY SPONSORED RESEARCH

This invention was made with Government support under Contract No. FA8650-05-C-7211 awarded by the United States Air Force. The Government may have certain rights in the invention.

GOVERNMENT RIGHTS

This invention was made with government support under Grant No. FA8650-06-C-7211, awarded by the United States Air Force. The government has certain rights in this invention.

FIELD OF THE INVENTION

The concepts, systems, circuits and techniques described herein relate to optical systems and more particularly to optical switches.

BACKGROUND OF THE INVENTION

As is known in the art, there is a trend toward providing lasers having power ranges in the range of several hundred watts or greater (so-called "high power" lasers).

As is also known, as high-power lasers move into the mainstream, there is a concomitant growing need for non-mechanical means to switch (or route) high-power laser beams from one node to another. As one commercial example, in the laser material processing field it is frequently cost effective to have a single high-power laser feed multiple material processing stations. The only presently known means to switch high-power lasers are mechanical, which are costly, slow, inefficient, unreliable, and limited in the number of available switching ports. This is especially true if the beam to be switched is a single mode in a fiber delivery cable, such as used with coherent lasers. This is due, at least in part, to the fact that the energy must be coupled into a fiber core that is often on the order of 10 microns in diameter. As a further example, with increasing use of optical sensors on aircraft, there is an increasing need a single laser, mounted within the aircraft, be capable of rapidly routing optical signals to multiple optical windows located around an aircraft periphery. To date, there has been no known means to non-mechanically switch high-power laser beams, let alone to do it efficiently, quickly, cost effectively, and reliably.

SUMMARY OF THE INVENTION

Described herein are concepts, systems, circuits and techniques to non-mechanically switch high power laser beams efficiently, quickly, cost effectively and reliably. Variations are described for both polarized and unpolarized light.

In accordance with the concepts, systems, circuits and techniques described herein, a switch for switching high power laser beams between locations or between applications includes a switchable, high-power (HP) liquid crystal (LC) half-wave plate (HWP) oriented with a fast axis at an angle of forty-five (45) degrees to an input polarization direction and a polarizing beam splitter adjusted such that the HWP acts as a polarizing rotator.

With this particular arrangement, an optical switch which enables the switching of laser beams having power levels ranging from up to about 50 kW is provided. In one embodiment, the optical switch enables the switching of laser beams having power levels ranging from about 100 W to at least 10 kW.

In accordance with a further aspect of the concepts described herein, techniques for constructing a wide variety of non-mechanical high power switches are provided.

The novelty of at least some of the concepts, systems, circuits and techniques described herein lies, at least in part, within the means by which such switch architectures can be instantiated with novel high-power componentry, and thereby enable high-power switches.

A switch in accordance with the concepts, systems, circuits and techniques described herein is capable of switching a minimum of 1 kW, and possibly ten times higher powers. As such, the concepts, systems and techniques described herein offer several orders of magnitude improvement in power handling over the current state-of-the-art switches.

A switch provided in accordance with the techniques described herein on the other hand, is capable of switching in less than 50 microseconds which is a full three orders of magnitude faster than known prior art techniques.

Polarizing beam splitting (PBS) cubes are often used to provide low-power optical switches. The physical position of the PBS output beam depends upon the polarization state of the input beam. By switching a polarization, a beam can be switched from one place to another. Switching a polarization is typically accomplished with the use of a polarization rotator.

However, until now, there have been no high-power polarization rotators suitable for use in such systems.

It has, however, in accordance with the concepts, systems, circuits and techniques described herein, been recognized that a high-power phase retarder may be utilized as a high-power polarization rotator. This use, in turn, enables a wide variety of high-power switches to be provided. In particular, by coupling such a high-power polarization rotator with a high-power polarizing beam splitter, a basic building block for optical switches which are able to switch high power laser beams is provided.

In accordance with a still further aspect of the concepts, systems, circuits and techniques described herein, a high-power phase retarder, implemented as a polarization rotator is used to enable operation of switch architectures which were heretofore only suitable for use at relatively low power levels) at power levels two to three orders of magnitude higher than has been previously possible.

DETAILED DESCRIPTION OF THE PREFERRED EMBODIMENTS

Figure 1:
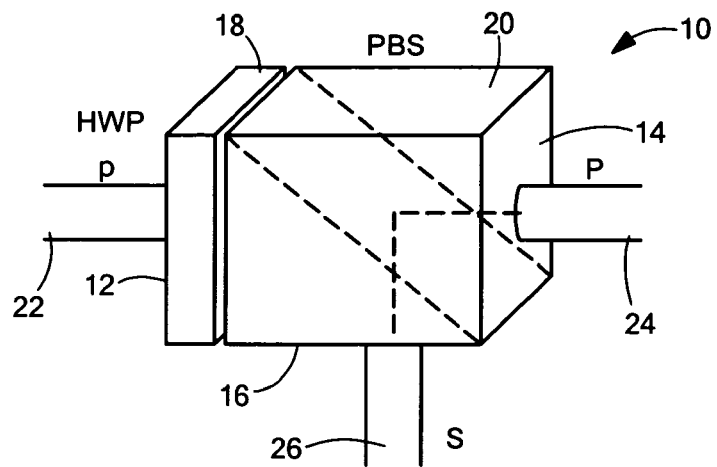
FIG. 1 is a block diagram of an optical switch having an input port and a pair of output ports (a 1×2 switch).

Referring now to FIG. 1, a switch 10 having an input 12 and a pair of outputs 14, 16 includes a switchable high-power (HP) liquid crystal (LC) half-wave plate (HWP) 18 disposed at the input 12 and a polarizing beam splitter (PBS) disposed adjacent the HWP 12.

It should be appreciated that switch 10 corresponds to a single input-two output switch (i.e. a 1×2 switch). Thus, switch 10 is capable of routing a high-power beam incident at the single input port 12 to either of the two output ports 14, 16.

In operation, an incident polarized laser beam (designated with reference numeral 22 in FIG. 1) is passed through a switchable high-power (HP) liquid crystal (LC) half-wave plate (HWP), oriented with its fast axis at 45° to the input polarization direction and subsequently through polarizing beam splitter (PBS) 20. When so adjusted, the HWP acts as a polarization rotator.

It should be appreciated that although beams 22, 24, 26 are here illustrated as free-space beams; those of ordinary skill in the art will appreciate that any or all of beams 22, 24, 26 could equally well be provided as a beam from a fiber laser (e.g. an expanded, collimated beam from a fiber laser).

The HWP in its "off" state converts an optical signal having a first polarization (designated as "p" polarization in FIG. 1) to a second polarization (designated as "s" polarization in FIG. 1). In its "on" state, the HWP is a null polarization operator (i.e. no polarization change is affected by the HWP). The nomenclature of "off" and "on" refers to the preferred embodiment of the HWP as a LCHWP, which becomes a null operator when voltage is applied but a fixed-orientation HWP when the voltage is off or at least much lower.

It should also be appreciated that in the exemplary embodiment of FIG. 1, the PBS is shown as a beam splitting cube. Those of ordinary skill in the art will appreciate that the PBS could equally be provided as an optical window coated with an appropriate dielectric thin film (an arrangement known as a polarizing plate with the plate oriented at the proper angle to effect the same polarization discrimination as a PBS).

A PBS nominally passes light having a first polarization (e.g. the p polarized light in FIG. 1) and reflects (here downward) light having a second polarization (e.g. the s polarized light in FIG. 1). The HWP and PBS form a switching stage and when the HWP is on, p polarized input light is passed through this switching stage to the first output port. When the HWP is off the input p polarized light is converted to s and reflected downward to the second output port.

In FIG. 1 the light entering and exiting each port is shown as a collimated free-space beam; however, for many high-power applications it is preferable to couple the output light to and from a fiber.

Figure 2:
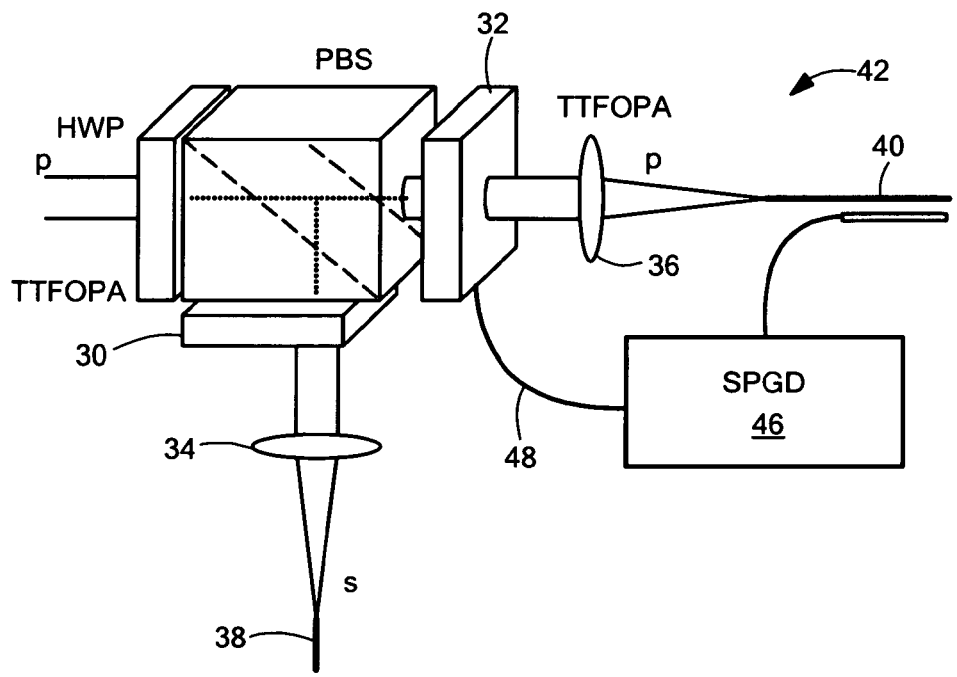
FIG. 2 is a block diagram of a 1×2 high-power switch for coupling into fibers.

Referring now to FIG. 2, in which like elements of FIG. 1 are provided having like reference designations, a high power switch providing light signals to optical fibers 38, 40 further includes a pair of optical phased arrays arranged as a tip/tilt/focus subsystem (TTFOPA) (i.e. two OPAs with their steering axes in different directions, preferably approximately perpendicular) provided at each port 14, 16 and lenses 30, 32 disposed to nominally focus output beams 24, 26 for matching of a fiber mode to respective ones of the optical fibers 38, 40.

The TTFOPA disposed at each port provides for very fine angular (azimuth and elevation) and very fine focus adjustments to match the fiber mode to a relatively high accuracy. Instead of having a TTFOPA at each output port, a single TTFOPA located upstream (in the common path) may be uses, as will be obvious to one of skill in the art. Furthermore, if the input beams may have significant positional variability as well as angular variability, a pair of TTFOPAs, separated by some propagation distance, may be used, to adjust both position and angle of the beams for optimum fiber coupling.

Re-coupling light back into a fiber is a notoriously sensitive process; the focussed spot must be within a few microns of the desired longitudinal position and a fraction of a micron of the desired transverse position to couple efficiently to the fiber mode. For a typical focal length of the coupling lens of some tens of mm, the required angular settability of the TTFOPA is of the order of 10 μrad. To ensure this, a control loop circuit 42 (or more simply control circuit 42) is coupled between the output optical fiber 40 and the TTFOPA 32.

Control circuit 42 samples the power level in the output fiber 40 via coupler 44 and provides the sampled signal to a processor which in turn provides signals to TTFOPA to adjust the two TTFOPA angles and focal powers in two dimensions for maximum power coupled into fiber 40. It should be appreciated that a similar control circuit can be provided at each additional output port.

In the exemplary embodiment of FIG. 2, control circuit 42 comprises a coupler 44 (here shown as a directional coupler) 44, a processor 46 and a signal path 48. Coupler 44 couples a portion of light signals propagating in optical fiber 40 to an input of processor 46 and signal path 48 couples signals from an output of processor 46 to TTFOPA 32. Thus, in this exemplary embodiment, coupler 44 couples a portion of the light signal propagating in the output fiber 40 to an SPGD processor which performs a stochastic parallel gradient descent (SPGD) process on the signals provided thereto. SPOD processor then provides signals along signal path 46 to TTFOPA to adjust the two TTFOPA angles and focal powers in two dimensions for maximum power coupled into fiber 40. A similar circuit can be at each additional output port.

It should be appreciated that the combinations of HWP 18 and PBS 20 shown in FIGS. 1 and 2 comprise basic building blocks for switching fabrics, the cascading of which enables the creation of many other complex switching fabrics.

It should of course be appreciated that embodiments may include a single TTFOPA, upstream of the HWP while other embodiments may include two TTFOPAs, either both upstream, both downstream, or one each.

Figure 3:
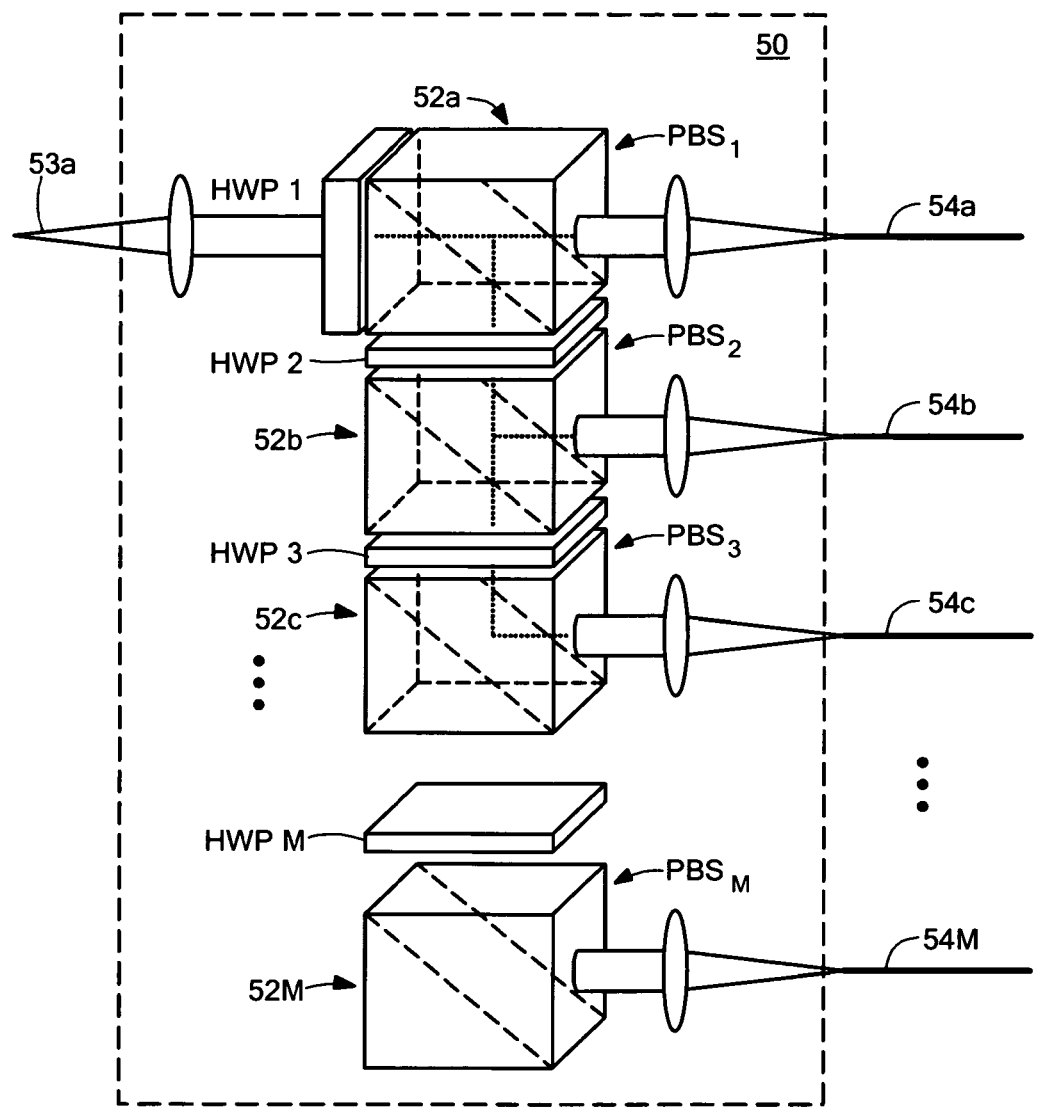
FIG. 3 is a block diagram of a 1×M high-power switch comprising M building blocks from FIG. 2

Referring now to FIG. 3 in which like elements of FIGS. 1 and 2 are provided having like reference designations, a switch 50 is provided from a plurality of, here M, switch stages 52a-52M, generally denoted 52. Switch 50 has an input 53a and a plurality of outputs 54a-54M and thus switch 50 is provided as a 1×M switch.

In this exemplary embodiment, each switch stage 52 is comprised of a 1×2 switch element 10 (also sometimes referred to herein as elementary building blocks 10 or more simply building blocks 10). Thus, switch 50 is provided from a plurality of, here M, 1×2 switch elements 10 which may be the same as or similar to switch elements 10 described above in conjunction with FIGS. 1 and 2.

It should be noted that switch elements 10 are coupled to provide the 1×M switch 50. Switch 50 is capable of routing an optical signal provided to input 50a to any of output ports 54a-54M (i.e. M different output ports). It should be appreciated that in the exemplary embodiment of FIG. 3, an example of switching between high-power optical fibers is shown, however, it should be understood that switch 50 is also capable of switching free space beams.

Operation of switch 50 can be explained as follows. Assume p polarized light is provided from a laser (not shown in FIG. 3) to switch input 53a and coupled to switch a first switch stage 52a. When $HWP_1$ of stage 52a is 'on' its retardance is zero and the light remains p polarized and passes straight through $PBS_1$ to a first output port 54a. When $HWP_1$ is 'off' its retardance is 180° and the polarization is transformed to s upon passage through $HWP_1$, and the beam is consequently reflected downward from $PBS_1$ and into the second switching stage 52b.

If $HWP_2$ in switch stage 52b is off, the light remains s polarized and reflects from $PBS_2$ and exits port 54b. If $HWP_2$ is 'on' the light is transformed to p polarization and passes through $PBS_2$ into the third switching stage 52c, and so on. In this way M switching stages allow the light to be routed to any of M ports. Such a 1×M switch is required if it is desired to route a centrally located high-power laser to multiple apertures distributed about the periphery of an aircraft. Some embodiments include an optional TTFOPA located upstream of the input near HWP1 or downstream of the outputs (just upstream of the focussing lens), as described above in conjunction with FIG. 2. Thus, it should be appreciated that embodiments may include a single TTFOPA, upstream of the HWP while other embodiments may include two TTFOPAs, either both upstream, both downstream, or one each.

In view of the above and as will become further apparent from the description herein below, it should now be appreciated that a variety of optical components, such as cross-connect switches for example, can also be constructed from multiple units of the basic building block of FIG. 1.

Figure 4:
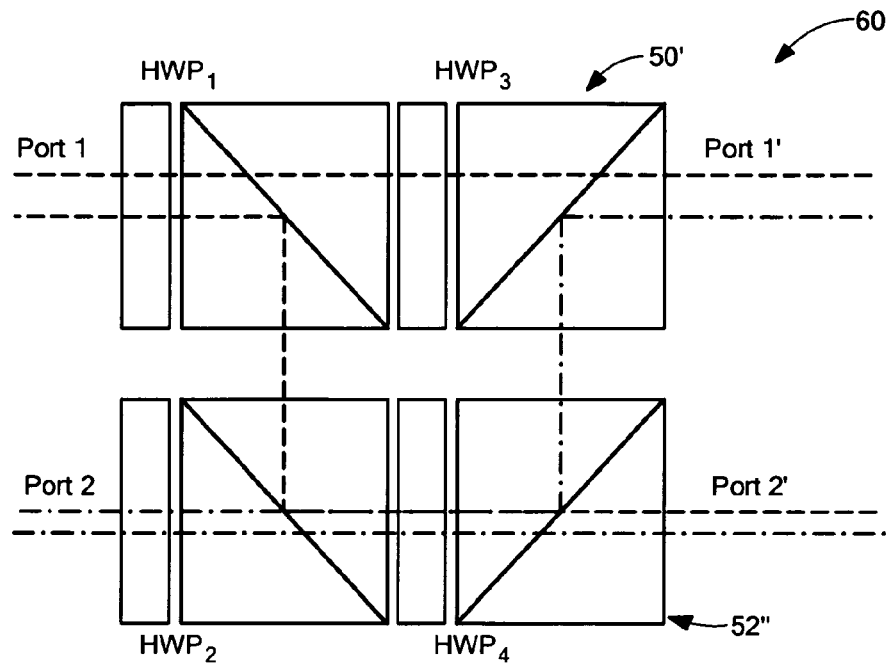
FIG. 4 is a block diagram of a 2×2 Optical Cross Connect Switch.

Referring now to FIG. 4, a cross connect switch is described. It should be noted that to promote clarity in the drawings and text a 2×2 cross connect 60 is described, but those of ordinary skill in the art will, after reading the description provided herein, appreciate that the same concepts may be applied to provide an N×N cross connect switch. Turning now to FIG. 4, the 2×2 cross connect 60 is provided if the input of a first 1×2 switch 50', which may be the same as or similar to the type shown in FIG. 3, is connected to port 1' and a second 1×M switch 50" of the same type is connected to port 2', a 2×M switch results. Such a switch can be used to implement redundancy.

In operation, port 1 can be connected to either port 1' or port 2', and port 2 can likewise be connected to either of ports 1' and 2'. With $HWP_1$ on and $HWP_3$ both 'on', a p-polarized beam at port 1 is transmitted straight through to port 1'. With $HWP_1$ and $HWP_2$ both 'on' and $HWP_4$ 'off', a p-polarized beam at port 1 is transmitted to port 2' via two reflections and a transmission through PBS cubes 1, 2, and 4. Switching from port 2 is accomplished similarly.

In one exemplary use, a primary high-power laser connected to port 1 can be routed to any of the M ports of the 1×M switch 50'. Should the primary laser fail, a backup high-power laser connected to port 2 of switch 50" can then be routed to any of the same M ports of the 1×M switch. This is a so-called blocking switch: one can switch either port 1 or port 2 to port 1' or port 2', but not both simultaneously.

Figure 5:
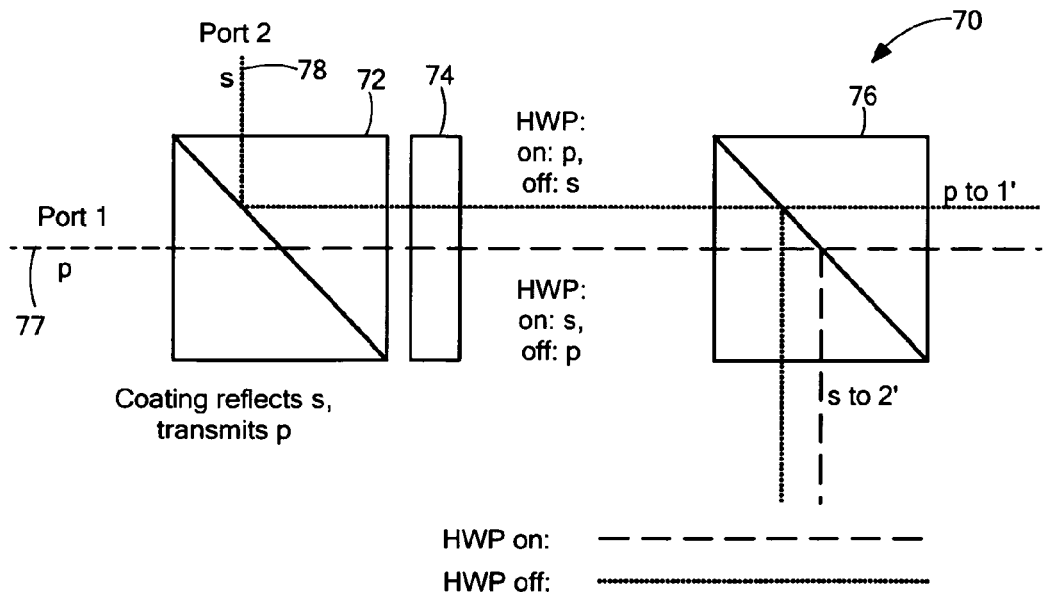
FIG. 5 is a block diagram of a block diagram of non-blocking 2×2 Cross-connect Switch.

Referring now to FIG. 5, a switch 70 having a so-called "non-blocking" switching architecture includes a first PBS 72, a HWP 74 and a second PBS 76 disposed in an optical path. PBSs 72, 76 and HWP 74 may be the same as or similar to PBS's and HWPs discussed above in conjunction with FIGS. 1-4. Switch 70 allows simultaneous switching of port 1 and port 2.

In operation, port 1 can be connected to either port 1' or port 2', and port 2 can likewise be connected to either of ports 1' and 2'. In particular, with HWP 74 off, a p-polarized beam at port 1 is transmitted straight through to port 1' and likewise an s-polarized beam at port 2 is reflected twice and transmitted thereby to port 2'. With HWP 74 'on' a p-polarized beam at port 1 is transmitted through PBS 72 and HWP 74 and reflected to port 2' as an s polarized beam via PBS 76. Likewise, the s polarized input at Port 2 is changed to p polarization and is transmitted to port 1'. Accordingly, a first input laser beam having a p polarization and designated with reference numeral 77 in FIG. 5 can be coupled to either of switch port 1' or switch port 2' through switch 70 by properly biasing HWP 74 to its on or off states.

Switching from port 2 is accomplished similarly. That is, with HWP 74 off, an s-polarized beam at port 2 is first reflected via PBS 72 through HWP 74 to PBS 76. PBS 76 which reflects the s polarized beam to port 2'. With HWP 74 'on' an s-polarized beam at port 2 is reflected through PBS 72 to HWP 74 and is transmitted straight through PBS 76 to port 1'. Accordingly, a second input laser beam having a s polarization and designated with reference numeral 78 in FIG. 5 can be coupled to either of switch port 1' or switch port 2' through switch 70 by properly biasing HWP 74 to its on or off states.

It should be appreciated that the switches discussed above assume a polarized input beam. Not all beams, however, are polarized. Thus, switches for non-polarized light are described.

One important example of switches for non-polarized light is that of laser pump diodes. One system architecture which utilizes centralized lasers and distributed apertures is centralized pump diodes distributed to multiple apertures, each with an associated gain medium. Thus, there is considerable interest in being able to route laser diode pump beams, which are generally not polarized.

Figures 6A, 6B:
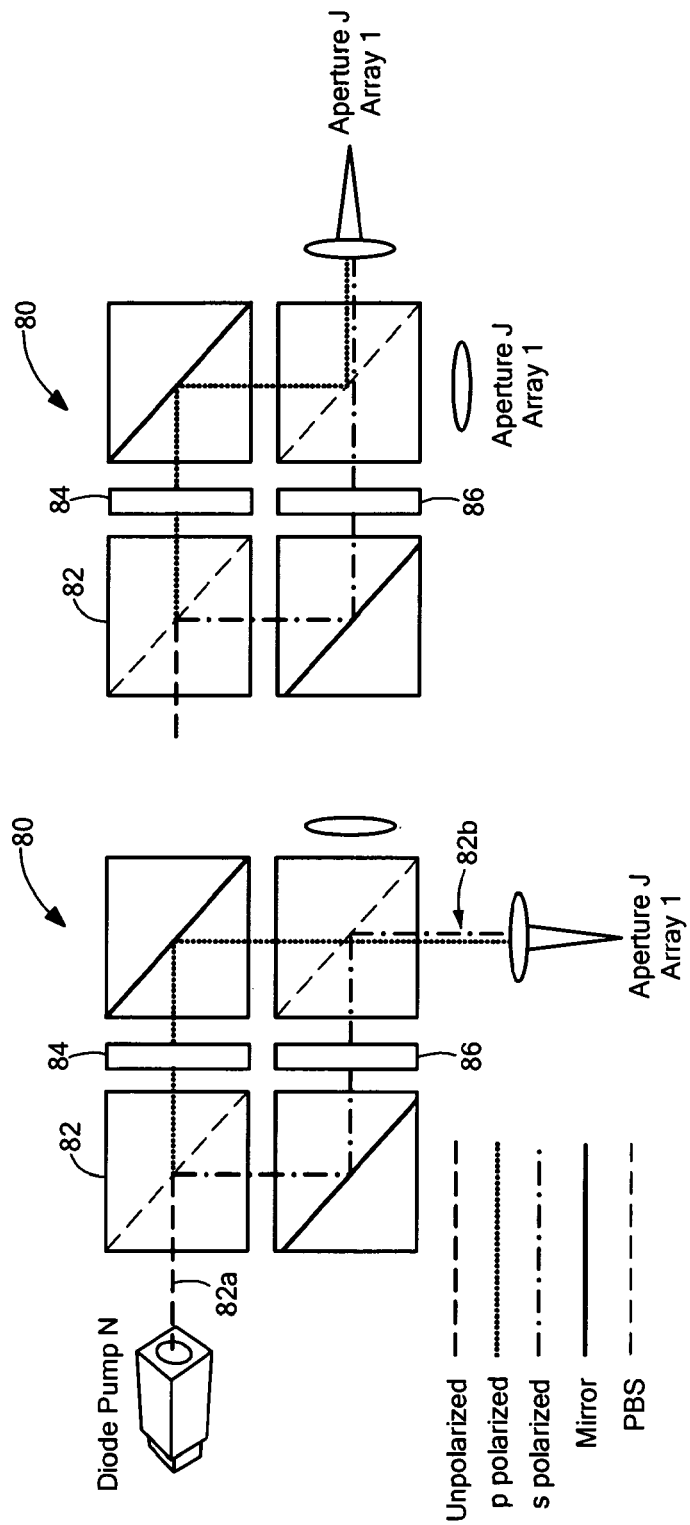
FIGS. 6A-6C are block diagrams of switches capable of use with unpolarized light.

FIGS. 6A and 6B illustrate a 1×2 switch 80 capable of operation with unpolarized light.

Referring now to FIG. 6A, an unpolarized input beam is split into s and p components at an input port 82a of a PBS cube 82. With the HWPs 84, 86 "off," both signal components (i.e. both the s and p components) are routed to a first output port 82b (designated as "Aperture J, Array 1" in FIG. 6A), and recombined.

FIG. 6B shows the case of both HWPs "on," in which case both of the s and p components are routed to a second output port 82c (designated as "Aperture J, Array 2" in FIG. 6B) where they are recombined.

Figure 6C:
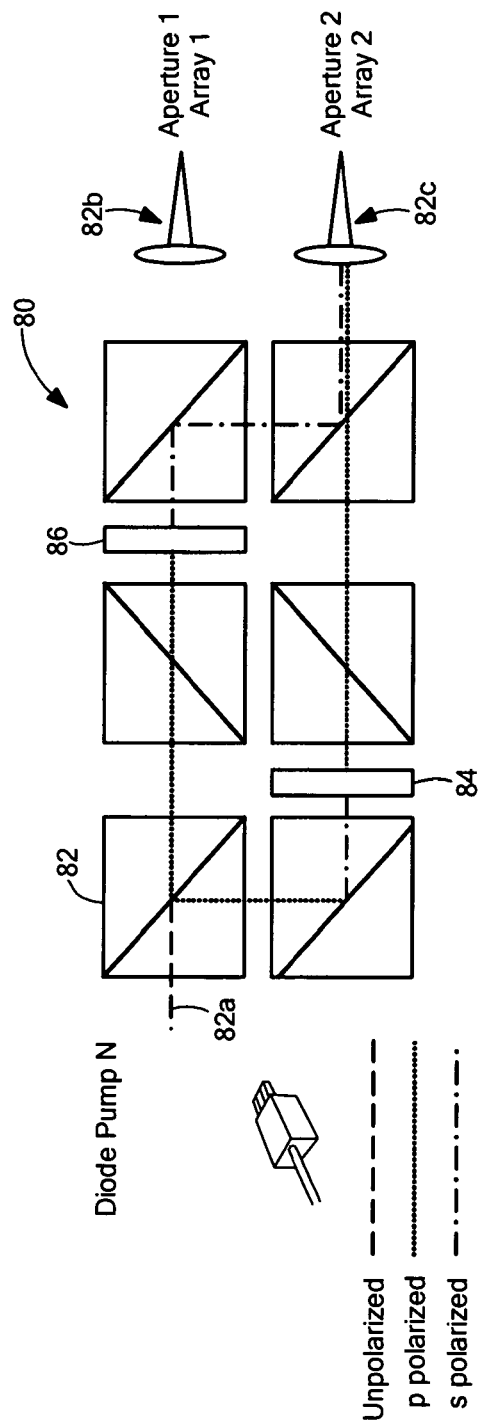

FIG. 6C shows an alternate embodiment in which when both HWPs are "off," in which case both of the s and p components are muted to the second output port 82*c* (designated as "Aperture 2, Array 2" in FIG. 6C) where they are recombined.

Figure 7:
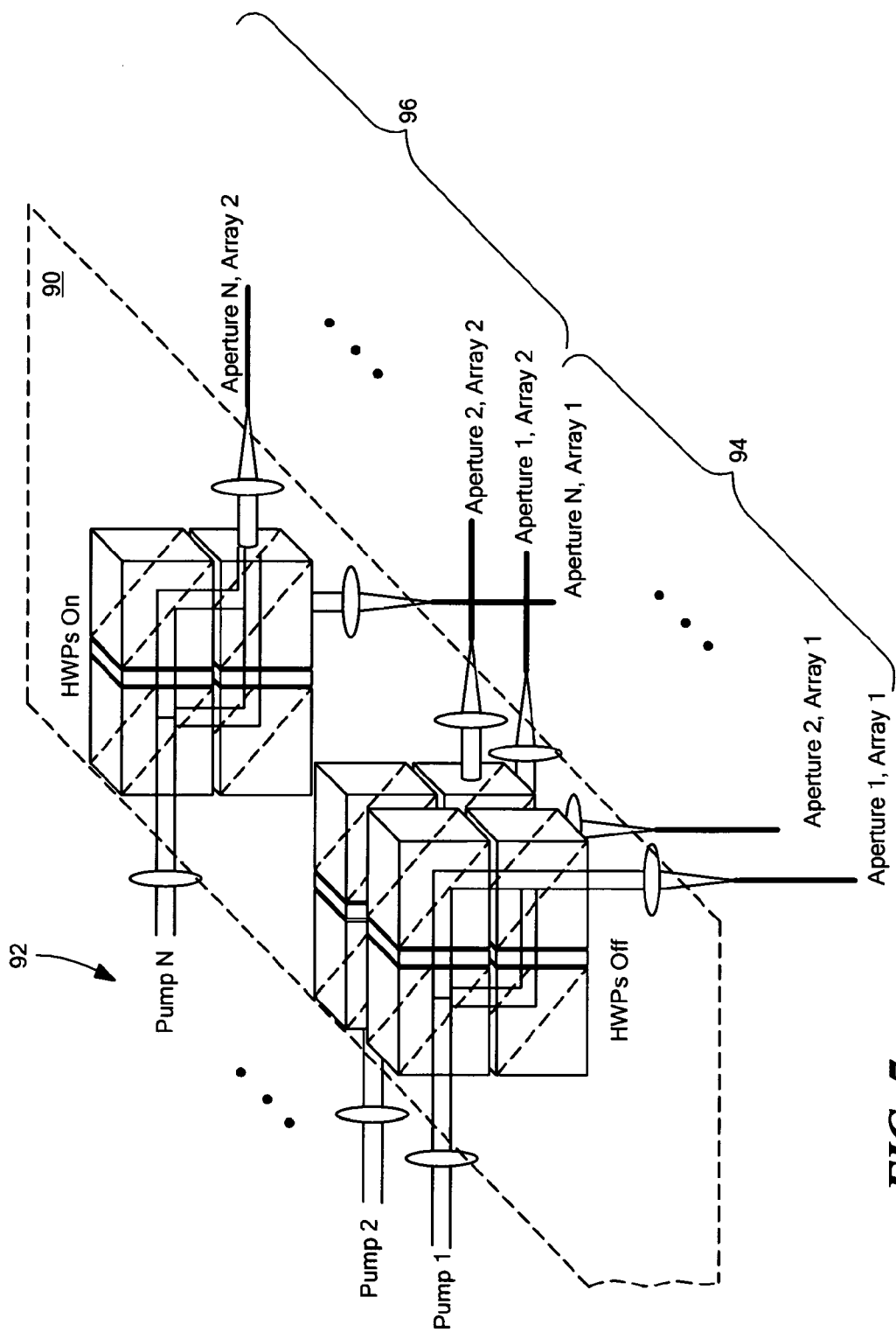
FIG. 7 is a block diagram of a N×2 router capable of coupling light from unpolarized laser diode pumps to multiple arrays.

Referring now to FIG. 7, an N×2 switch 90 for switching unpolarized diode pumps (which are intended to be representative of any unpolarized laser source) is provided from a plurality of switch stages 92 (here N switch stages) each of which may be the same as or similar to a cascade of switches 70 described above in conjunction with the figure which replaces 6.

In this exemplary embodiment, a plurality of laser sources, here shown as N diode pumps 92, are switched to one of first and second phased arrays 94, 96. With no loss of generality, in this exemplary embodiment switch 90 is arranged such that diode pump N is routed to the Nth aperture of either of first or second arrays, 94, 96. Those of ordinary skill in the art will appreciate, of course, that other switch arrangements (e.g. to route diode pump N to other apertures) may be used.

In this switch, P and S polarizations traverse different paths and experience different losses. Typical losses for each switch interface are listed for both S and P components. The largest loss involves re-coupling the light back into a fiber. In this example, a large-core fiber is assumed, as is usually the case for the transport of unpolarized, incoherent pump lasers. Coupling losses would be higher, perhaps twice as high, for coupling into a single mode fiber. These coupling losses are not relevant for the free-space version of the switch. Pumps 1 through N experience similar losses as those tabulated in the Table.

It should be appreciated that the polarizing beam splitters appropriate for use as described herein are available as high-power options of COTS components.

Figure 8:
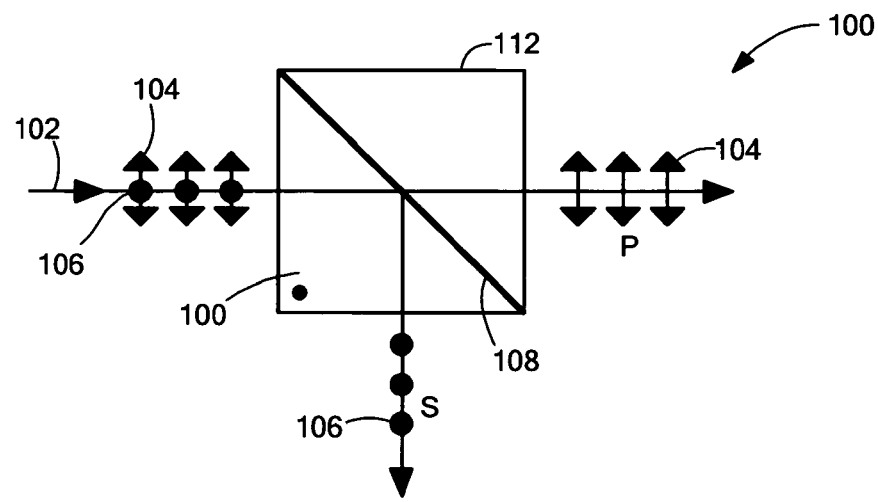
FIG. 8 is a block diagram of which illustrates a operation of a polarizing beam splitter cube.

Referring now to FIG. 8, a polarizing beam splitter (PBS) 100 capable of operation as a polarizer is described. An incident beam 102 comprises components of both p (parallel to the plane of incidence, depicted with arrows generally denoted 104) and s (perpendicular to the plane of incidence, depicted with dots generally denoted 106) polarization. A diagonal interface 108 between the two right-angle prisms 110, 112 is provided with a thin-film dielectric coating that allows p polarization to pass and s polarization to be reflected.

The types of thin-film coatings typically used limit the useful wavelength range to about ±10% about the center design wavelength. Consequently, switches are intended for use at or about standard laser wavelengths. Transmission through such a PBS is typically >95% for p polarization and reflection is >99% for s polarization. Note that the switch is arranged such that switching to port M requires M (low loss) s reflections but only a single (higher loss) p transmission.

The entrance and exit faces are typically provided with high-quality antireflection coatings. Commercially available PBS' comprised of thin-film coated fused silica glass prisms, as an example, have laser damage thresholds typically of the order of 5 MW/cm$^2$ (cw) and 10 J/cm$^2$ (10 ns), which is more than adequate for the 1 to 50 kW (cw) power levels contemplated for this switch. See lasercomponents.com/us/product/mirror-coatings/ for typical performances.

Alternatively, thin-film polarization plates can be used in place of the polarization beam splitting cubes. These have similar damage thresholds, but offer somewhat higher transmissions, especially for p polarization, where T>97% is routinely offered for high-power versions. The use of polarization plates instead of prisms can reduce the amount of glass in the optical path, which is beneficial for preservation of high beam quality, which is needed for efficient coupling into a single-mode fiber.

The variable HWP retarder as described herein is based upon liquid crystal (LC) technology, and is used primarily as a two-state switch.

Figure 9:
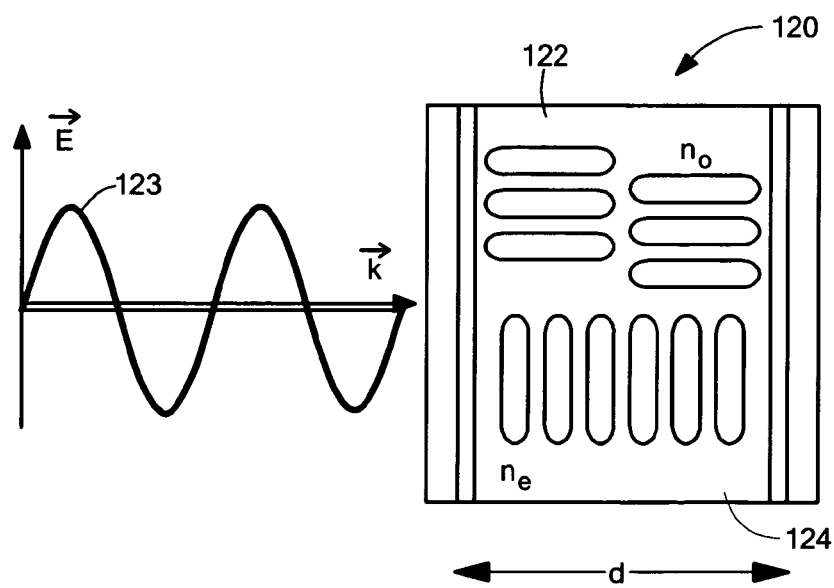
FIG. 9 is a block diagram of a liquid crystal (LC) phase retarder.

Referring now to FIG. 9, a phase retarder 120 comprises two transparent substrates, each provided with transparent, conducting thin-film electrodes and appropriate antireflection coatings, and a liquid crystal layer of appropriate thickness sandwiched between the substrates. The upper portion 122 illustrating the liquid crystals oriented such that an incident wave 123 sees an ordinary refractive index no (the voltage 'on' state); the lower portion 124 illustrates the liquid crystals oriented such that an incident wave sees the extraordinary refractive index $n_e$ (the voltage 'off' state).

The phase retardance $\delta$ is given by $\delta = 2\pi d \Delta n / \lambda$, where d is the cell thickness, $\Delta = n_e - n_0$ is the LC birefringence, and $\lambda$ the wavelength.

A HWP is constructed with sufficient LC thickness to provide a minimum of 180° retardance with zero applied voltage at a chosen wavelength. As the applied voltage is increased, the LC retardance decreases, and with sufficient voltage the retardance can be reduced effectively to zero. For HWPs fabricated using nematic liquid crystals the necessary 'on' voltage is typically less than 10 V. For HWPs fabricated using much faster switching polymer network liquid crystals, the 'on' voltage may be on the order of 100V. A typical LC thickness for a HWP varies from a few microns to ten microns or so, depending upon the LC used. The so-called "fast axis" of the HWP is oriented at 45° to the polarization direction of the input beam, such that the HWP acts as a 90° polarization rotator when the retardance is 180° (the voltage 'off' state). With sufficient applied voltage to reduce the retardance to zero (the voltage 'on' state) the device passes arbitrary polarization without change.

Phase retarders suitable for high-power operation have only recently been developed and demonstrated and in an Adaptive Photonic Phase Locked Element (APPLE).

It has been found that while typical LC retarders can only handle a few watts before heating to destruction or inducing unsatisfactory levels of aberrations, the high-power retarders as described herein are novel components, and it is their unique properties that enable the present switch.

High power operation in such phase retarders is achieved by: (1) reducing absorption losses of the transparent conducting thin-film electrodes; and (2) enabling efficient removal of thermal energy through the use of high thermal conductivity substrates such as sapphire substrates with an epitaxially grown gallium nitride (GaN) high electron mobility transistor (HEMT) layer that acts as a very efficient transparent conducting thin film. The combination of sapphire substrates and GaN HEMT layers has enabled the fabrication of wave plates having total absorption as low as 0.3%. These devices have been tested with 1 kW laser input and have been shown to be capable of operation as phase retarders at the high energy levels, but also of crucial import, the transmitted wave front remains diffraction limited. Furthermore, modeling predicts operation at power levels as high as 50 kW may be practical with proper cooling.

An alternate substrate/thin-film system comprises indium oxide on either sapphire or spinel. Although the absorption loss is somewhat larger (about 1% per retarder), fabrication is simplified.

In practical systems, it is recognized such phase retarders will exhibit neither exactly zero phase retardance when fully 'on', nor exactly 180° phase shift when 'off'. Consequently, even if the input polarization is pure p polarized, the polarization of the beam as input to the PBS is not purely p or purely s, but instead contains a small amounts of the cross polarization. As a result the switch suffers from cross-port leakage.

For the low-power switching fabrics used in telecommunications such cross-port leakage causes channel cross talk and often must be kept very small, typically −50 db or even less. However small amounts of power leakage are not usually an issue for the high-power applications supported by such switches, and fabrication tolerances are consequently not particularly stringent; it is not usually necessary that the switching states exhibit exactly zero or 180° phase retardance or that the input beam be perfectly polarized. However, where necessary, such leakage can be reduced or in some cases even minimized by constructing the wave plates to have retardations slightly greater than 180° and then tuning them for optimal performance by application of a small voltage, determined by prior calibration, or monitoring of the ports.

It is the nature of this switch that there will be fairly high levels of cross-port power exchanges during switching transients. For instance, as the switch of FIG. 3 is reprogrammed to transfer energy from port 1 to port 3, considerable energy can be transferred to port 2 during the finite switching times of the HWPs when the polarization state is neither completely s nor completely p. For applications where this is not acceptable, the input laser (with the term "input laser" used herein to mean any suitable light source) can be blanked for the duration of the switching transients.

Polarizing beam splitting cubes are often used to fabricate low-power optical switches. The physical position of the output beam depends upon the polarization state of the input beam. By switching the polarization state, typically using a polarization rotator, a beam can be switched from one place to another. Until now there have been no high-power polarization rotators. However, as discussed above, it has in accordance with the concepts, systems, circuits and techniques described herein, a high power phase retarder can be used as a high power polarization rotator, which in turn enables a wide variety of high power switches.

As also discussed above, the high power polarization rotator (switch) coupled with a high power polarizing beam splitter comprises a basic building block for optical switches (e.g. as shown and described in conjunction with FIG. 1).

Described herein are systems, circuits and techniques to replace low-power components of well-known switching architectures with novel high power versions. The result is non-mechanical switches that not only handle high power, but are significantly less vibration sensitive (no moving parts), maintain alignment in harsh environments, have high throughput, and switch very fast (microseconds instead of milliseconds). The new switches also scale to large port numbers. These switches appear to have all the properties needed for our intended applications on aircraft, as well as other venues.

The family of architectures of the switches to be claimed is well known for the low power regime. The novelty of at least some of the concepts described herein lies not necessarily in the switch architecture, but rather the in the means by which such well-known architectures can be emulated with novel high-power components (i.e. a high power wave plate and a polarizing beam splitter) which can be combined to enable high-power switches. In particular one innovation of the concepts, systems and techniques described herein entails the application of a high power phase retarder, implemented as a polarization rotator, to enable operation of these same low-power switch architectures at power levels at least two to three orders of magnitude higher than has been previously possible.

What is claimed is:

1. An optical switch capable of routing an optical beam incident at one or more input ports of the optical switch to either of two or more output ports, the optical switch comprising:
   at least one switching stage, each of the at least one switching stages comprising:
      a switchable high-power liquid crystal (LC) half-wave plate (HWP), oriented with its fast axis at 45° to an input polarization direction such that in response to an incident polarized laser beam provided to said switchable high-power liquid crystal, half-wave plate, said HWP acts as a polarization rotator;
      a polarizing beam splitter (PBS) disposed in an optical path to intercept light signals output from said switchable high-power liquid crystal (LC) half-wave plate (HWP); and
      a tip/tilt/focus optical phased array (TTFOPA) disposed at an output of the PBS, wherein the TTFOPA comprises two optical phased arrays with their steering axis in different directions.

2. The optical switch of claim 1 further comprising a plurality of switching stages cascade coupled to provide the optical switch having at least one input port and a plurality of output ports.

3. The optical switch of claim 1 wherein:
   in response to said HWP being in a first state, said HWP is capable of converting an optical signal having a first polarization to an optical signal having a second, different polarization; and
   in response to said HWP being in a second different state, said HWP operates as a null polarization operator.

4. The optical switch of claim 1 wherein said PBS is provided as one of:
   a beam splitting cube; or
   a polarizing plate.

5. The optical switch of claim 1 wherein said PBS nominally passes light having a first polarization and reflects light having a second different s polarization and when the HWP is on, light having the first polarization is passed through the switching stage to a first output port of the switching stage and when the HWP is off, the input light having the first polarization is converted to the second different s polarization and reflected to a second output port the switching stage.

6. The optical switch of claim 1 further comprising:
   a collimating lens disposed at an output of at least one of said at least one switching stages.

7. The optical switch of claim 6 where said collimating lenses are provided to nominally focus the output beams for matching of the fiber mode.

8. The optical switch of claim 6 further comprising a control loop circuit disposed on the first output port of a first switching stage, said control loop circuit coupled between the output of the first switching stage and the TTFOPA.

9. The optical switch of claim 8 wherein said control loop circuit comprises:
   a directional coupler; and
   an SPGD processor wherein said directional coupler couples power from a fiber coupled to the output port of the stage and provides the coupled signal to said SPGD processor and wherein said SPGD processor adjusts the TTFOPA angles and focal power in two dimensions for maximum power coupled into the fiber.

10. The optical switch of claim 6 further comprising a plurality of switching stages cascade coupled to provide the optical switch having at least one input port and a plurality of output ports.

11. The optical switch of claim 10 further comprising a control loop circuit coupled between the output of each switching stage and the TTFOPA within said switching stage.

12. An optical system comprising:
a plurality of unpolarized laser diode pumps;
first and second phased arrays; and
an optical switch coupled between said plurality of unpolarized laser diode pumps and said first and second phased arrays, wherein said optical switch is capable of switching said plurality of diode pumps between the first and second phased arrays wherein said optical switch comprises:
at least one switching stage, each of the at least one switching stages comprising:
a switchable high-power liquid crystal (LC) half-wave plate (HWP), oriented with its fast axis at 45° to an input polarization direction such that in response to an incident polarized laser beam provided to said switchable high-power liquid crystal, half-wave plate, said HWP acts as a polarization rotator; and
a polarizing beam splitter (PBS) disposed in an optical path to intercept light signals output from said switchable high-power liquid crystal (LC) half-wave plate (HWP).

13. The system of claim 12 wherein said switch is configured such that pump N is routed to the Nth aperture of either the first array or the second array.

14. An optical switch that can route a high-power beam incident at one or more input ports to either of two or more output ports wherein an incident polarized laser beam is passed through a switchable high-power liquid crystal (LC) half-wave plate (HWP), oriented with its fast axis at 45° to the input polarization direction, followed by a polarizing beam splitter (PBS), which, when so adjusted, the HWP acts as a polarization rotator, and further followed by a tip/tilt/focus optical phased array (TTFOPA) disposed at an output of the PBS, wherein the TTFOPA comprises two optical phased arrays with their steering axis in different directions.

15. The switch of claim 14 wherein:
when the HWP is in its "off" state converts p polarization to s and in its "on" state it is a null polarization operator; and
wherein the PBS is one of a beam splitting cube or a window coated with an appropriate dielectric thin film, an arrangement known as a polarizing plate, said plate oriented at the proper angle to effect the same polarization discrimination as a PBS.

16. The switch of claim 14 wherein the PBS nominally passes p polarized light and reflects s polarized light and when the HWP is 'on', p polarized input light is passed through this switching stage to a first output port and when the HWP is 'off' the input p polarized light is converted to s and reflected to a second output port.

17. An optical switch capable of routing a high-power beam incident at one or more input ports of the optical switch to either of two or more output ports, the optical switch comprising:
at least one switching stage, each of the at least one switching stages comprising:
a switchable high-power liquid crystal (LC) half-wave plate (HWP), oriented with its fast axis at 45° to an input polarization direction such that in response to an incident polarized laser beam provided to said switchable high-power liquid crystal, half-wave plate, said HWP acts as a polarization rotator;
a polarizing beam splitter (PBS) disposed in an optical path to intercept light signals output from said switchable high-power liquid crystal (LC) half-wave plate (HWP);
a collimating lens disposed at an output of at least one of said at least one switching stages; and
at the output of each of said at least one switching stages having a collimating lens coupled thereto, a tip/tilt/focus optical phased array (TTFOPA) disposed between an output of a PBS of each of said at least one switching stages and said respective collimating lens, wherein the TTFOPA comprises two optical phased arrays with approximately perpendicular steering axes.

18. The optical switch of claim 17 further comprising a plurality of switching stages cascade coupled to provide the optical switch having at least one input port and a plurality of output ports.

19. The optical switch of claim 17 wherein:
in response to said HWP being in its "off" state, said HWP is capable of converting an optical signal having a first polarization to an optical signal having a second, different polarization; and
in response to said HWP being in its "off" state, said HWP operates as a null polarization operator.

20. The optical switch of claim 17 wherein said PBS is provided as one of:
a beam splitting cube; or
a polarizing plate.

21. The optical switch of claim 17 wherein said PBS nominally passes light having a first polarization and reflects light having a second different s polarization and when the HWP is on, light having the first polarization is passed through the switching stage to a first output port of the switching stage and when the HWP is off, the input light having the first polarization is converted to the second different s polarization and reflected to a second output port the switching stage.

22. The optical switch of claim 17 where said collimating lenses are provided to nominally focus the output beams for matching of a fiber mode to an optical fiber.

23. The optical switch of claim 17 further comprising a control loop circuit disposed on the first output port of a first switching stage, said control loop circuit coupled between the output of the first switching stage and the TTFOPA.

24. The optical switch of claim 23 wherein said control loop circuit comprises:
a directional coupler; and
an SPGD processor wherein said directional coupler couples power from a fiber coupled to the output port of the stage and provides the coupled signal to said SPGD processor and wherein said SPGD processor adjusts the TTFOPA angles and focal power in two dimensions for maximum power coupled into the fiber.

25. The optical switch of claim 17 further comprising a plurality of switching stages cascade coupled to provide the optical switch having at least one input port and a plurality of output ports.

26. The optical switch of claim 25 further comprising a control loop circuit coupled between the output of each switching stage and the TTFOPA within said switching stage.

* * * * *